Sept. 15, 1953   C. B. DALE ET AL   2,652,258
PHONOGRAPH
Filed April 13, 1951   6 Sheets-Sheet 1

INVENTORS.
Colin B. Dale
Arne L. Berg
Harry H. Wagner
By: Ohmmg & Bhmmg
Attys.

Sept. 15, 1953 C. B. DALE ET AL 2,652,258
PHONOGRAPH
Filed April 13, 1951 6 Sheets-Sheet 2

INVENTORS.
Colin B. Dale
Arne L. Berg
Harry H. Wagner
By: Banning & Banning
Attys.

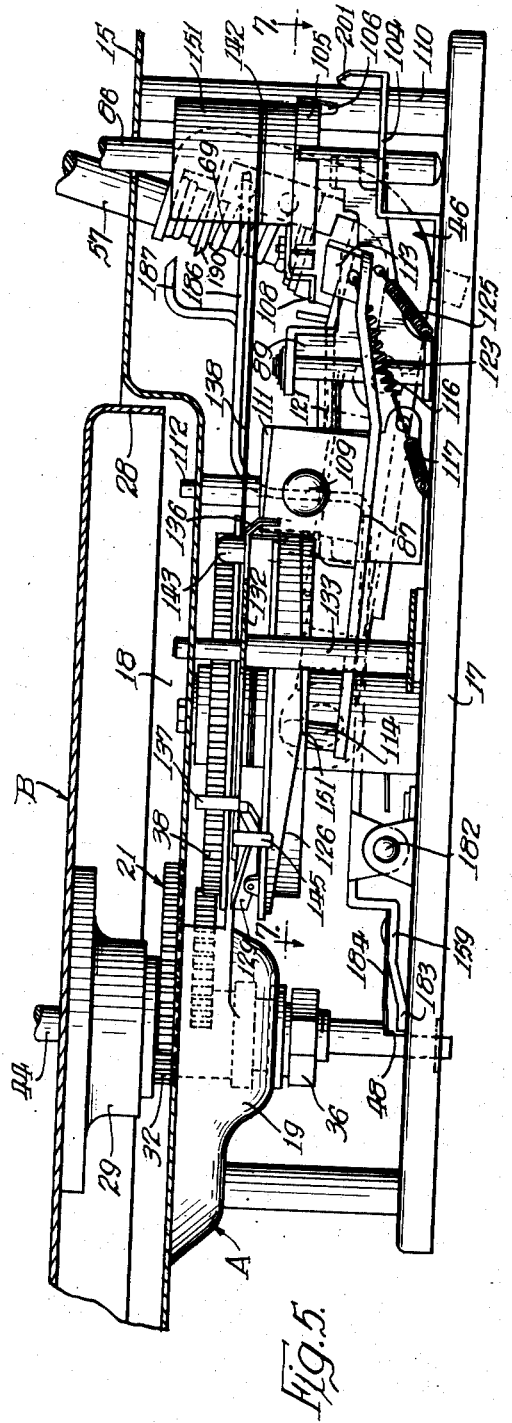

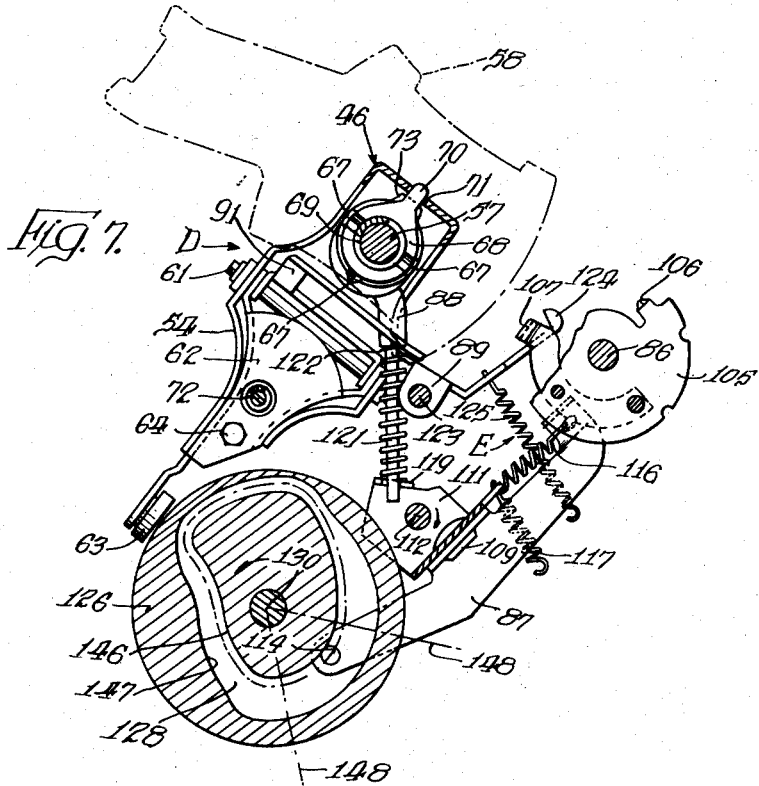
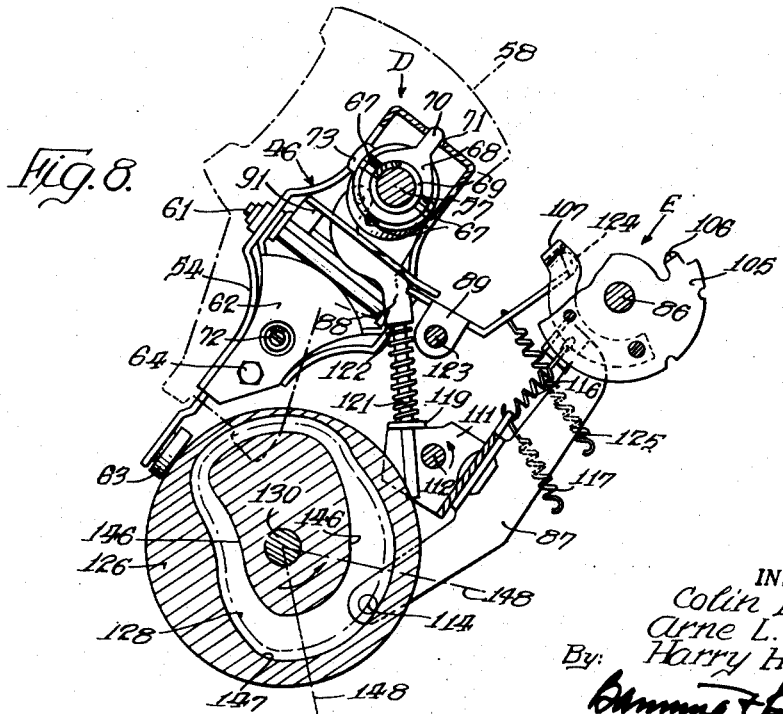

Sept. 15, 1953      C. B. DALE ET AL      2,652,258
PHONOGRAPH
Filed April 13, 1951      6 Sheets-Sheet 5
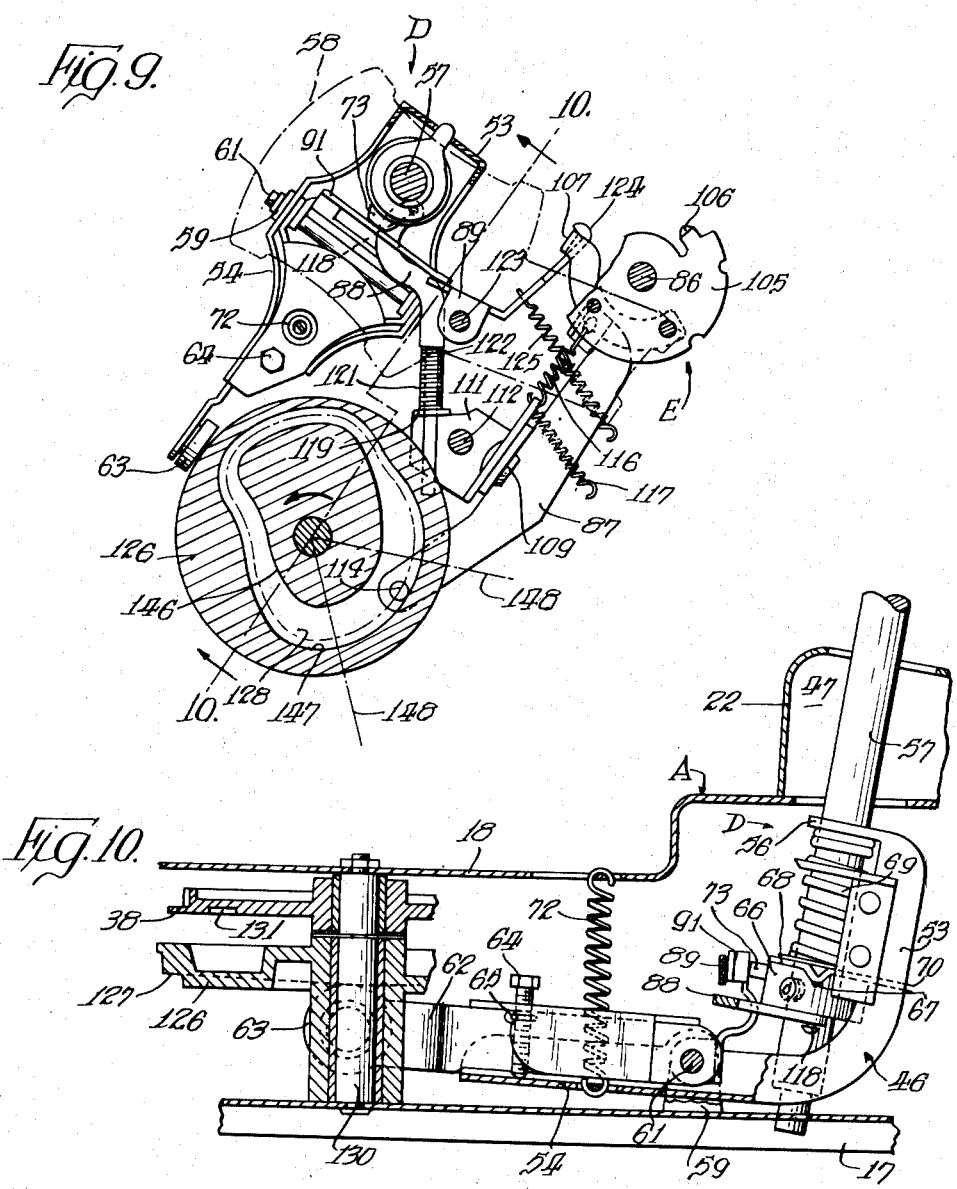
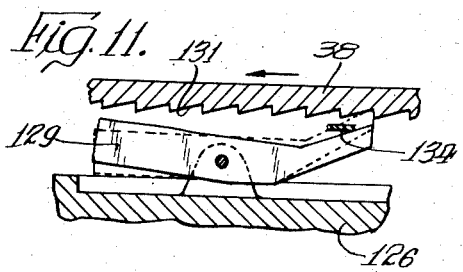
INVENTORS.
Colin B. Dale
Arne L. Berg
Harry H. Wagner
By: Denning & Denning Attys.

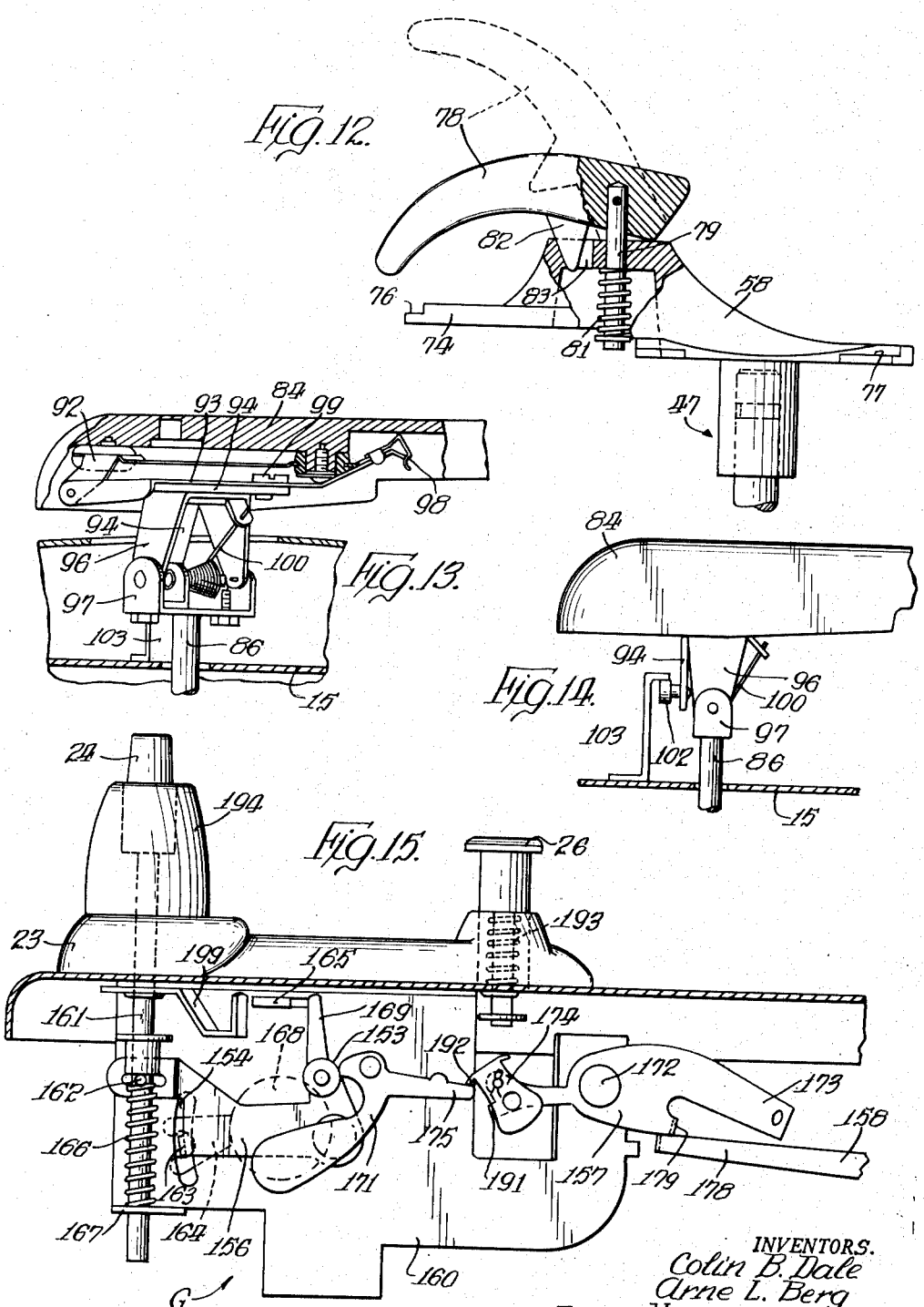

Patented Sept. 15, 1953

2,652,258

UNITED STATES PATENT OFFICE 2,652,258

PHONOGRAPH

Colin B. Dale, Oak Park, and Arne L. Berg and Harry H. Wagner, Chicago, Ill., assignors to Webster-Chicago Corporation, Chicago, Ill., a corporation of Illinois Application April 13, 1951, Serial No. 220,848

3 Claims. (Cl. 274—10)

This invention relates to phonographs, and more particularly to phonographs equipped with a record changing mechanism.

At the present time there is wide use of phonograph records requiring operation at three different speeds, viz. approximately 33, 45 and 78 R. P. M. For these different speeds the records are also being made in diameters of 12", 10" and 7". The manufacturers of record changers have faced the necessity of redesigning their phonographs for operation with records having these different diameters and playing speeds.

This has involved also the problem of automatically controlling the swinging of the tone arm away from its rest or starting position to insure positioning of its stylus at the beginning-of-play position for each record.

The main objects of this invention are to provide an improved coordinated record release and tone arm actuating mechanism for automatically accommodating the set down of the tone arm stylus to the diameter of the record next to be played; to provide an improved selective record marginal support of the push-off type for accommodating records of any of the three different diameters being currently produced; to provide improved means whereby adjustment of the record marginal support to a particular diameter record will control swinging of the tone arm to insure its stylus being set down at the correct beginning-of-play position for the record next to be played; to provide an improved motor switch mechanism which, after being set by the usual reject button, may be manually retracted at any time or be automatically retracted upon completion of play of the last record; and to provide an improved coordinated record marginal support and push-off and tone arm swinging and set down mechanisms so simple in construction as to make their manufacture comparatively economical and their operation entirely simple and certain.

In the accompanying drawings:

Fig. 5 is a slightly enlarged vertical sectional view of the mechanism shown in Fig. 4, taken on line 5—5 thereof;

Fig. 6 is a view of much of the mechanism shown in Fig. 5, but with the tone arm operating lever and shaft shown in positions which are opposite thereto;

Fig. 7 is a horizontal sectional view, slightly reduced, taken on line 7—7 of Fig. 5, showing the record marginal support and tone arm operating parts in position to set down the tone arm stylus at the correct beginning-of-play position for a 12" record;

Fig. 8 is a similar view for a 7" record;

Fig. 9 is a similar view for a 10" record;

Fig. 10 is a sectional elevational view of the mechanism shown in Fig. 9, as viewed from the plane of line 10—10 thereof;

Fig. 11 is an enlarged fragmentary detail showing the velocity latch whereby the record release and tone arm shifting cam means is intermittently connected to be operated by the turntable; in this view the velocity latch is shown in full lines as retracted and in dotted lines as engaged;

Fig. 12 is a fragmentary detail, partly in section, of the record supporting head and the associated record hold-down;

Fig. 13 is an enlarged fragmentary sectional detail of the tone arm mounting, as viewed from the plane of line 13—13 of Fig. 1;

Fig. 14 is a side elevational view of the hinge end of the tone arm mounting; and Fig. 15 is an enlarged fragmentary elevational view of the last record motor shut-off mechanism, the motor switch actuating levers in this view being shown in their "on" positions in contrast with the "off" positions of Fig. 3.

Figure 1:
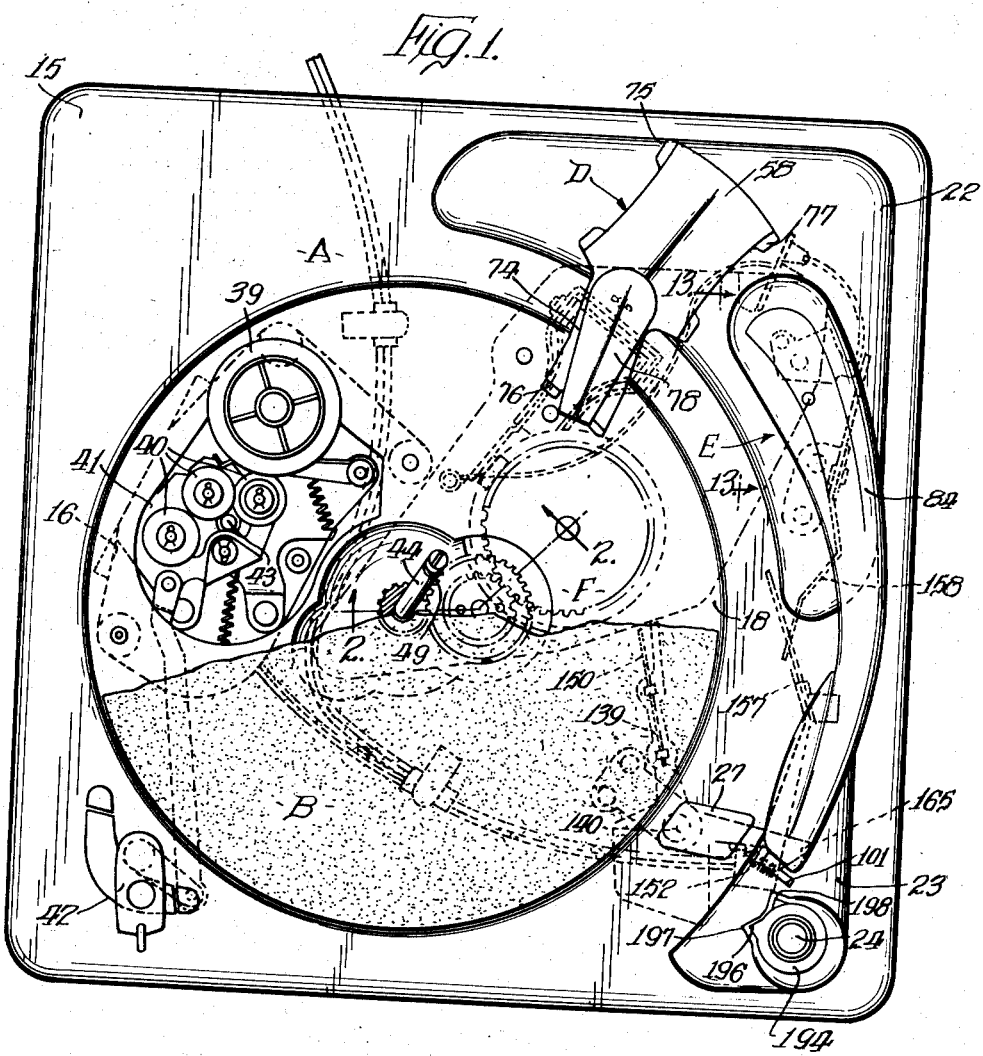
Figure 1 is a plan view of a suggestive exemplification of record changing mechanism embodying this invention, the tone arm being shown in its rest or starting position and the turntable being broken away to more clearly show the change-speed driving mechanism and the gearing for record changing and tone arm swinging.

A distinctive feature of this invention relates to a three-position "push-off" type selective record marginal support with which is associated means for so conditioning a cam actuated tone arm swinging mechanism as to insure setting down of the tone arm stylus on the record next to be played at the correct beginning-of-play position. There is also associated with record support and tone arm swinging means other means coacting therewith for cutting off the motor switch following the playing of the last record released from the selective record support.

The illustrated phonograph comprises a supporting base A, a turntable B, a three speed motor drive C, a selective record marginal support and release mechanism D, a tone arm positioning mechanism E, a velocity latch controlled cam means F for coordinating operation of the record marginal support and tone arm positioning mechanisms D and E, and a last record motor shut-off mechanism G.

The supporting base A herein shown comprises a main base section 15 and subbase sections 16 and 17 for respectively supporting the change speed motor drive C, the selective record support and release mechanism D, and the tone arm positioning mechanism E. The main base section 15 which is of rectangular form, may consist of a flanged plate wherein is a depression 18 slightly eccentric of the base section 15. At the center of this depression is formed a well 19 wherein is journaled the turntable B and the gearing 21 whereby the turntable B is connected to the velocity latch controlled cam means F. At two adjacent corners of the main base section 15 are positioned crescent shaped plates 22 and 23 above the former of which are mounted the exposed parts of the selective record support and the tone arm positioning mechanisms D and E. Above the other crescent plate 23 is mounted a reject button 24 and a stop button 26. Inwardly adjacent the crescent plate 23 is a stylus pad 27. The subbase sections 16 and 17 are of irregular form, as will be apparent from the dotted outline in Fig. 1 and the view shown in Fig. 4. These subbase sections are suspended below the main base section by the usual posts and spacers.

Figure 2:
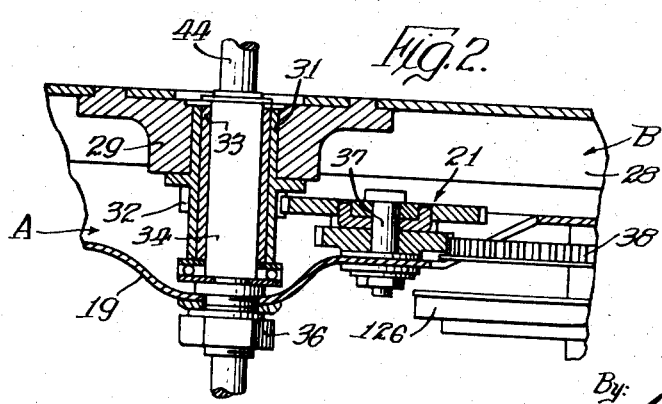
Fig. 2 is an enlarged fragmentary cross-sectional view of the turntable hub and gearing, taken on line 2—2 of Fig. 1.

The turntable B may consist of a plate having a depending peripheral flange 28 (see Fig. 5) and a mounting hub 29 (see Fig. 2) to which is secured a sleeve 31 having a pinion 32 formed thereon intermediate its ends. Within the sleeve 31 is arranged a bushing 33 whereby the turntable B is rotatably supported on a stud shaft 34 secured to the base section 15 at the center of the well 19 by a clamping nut 36 (see Fig. 2). The gearing 21 comprises two gears secured together and journaled on a pin 37 so that the upper gear is positioned to mesh with the pinion 32 on the turntable B, whereas the lower gear is positioned to mesh with a gear 38 forming a part of the velocity latch controlled cam means F to be described more fully hereinafter.

The three speed motor drive C which forms no part of this invention comprises a swingably mounted friction wheel 39 normally urged to establish a driving relationship between the turntable B and either of three differently dimensioned idlers 40. These idlers are mounted on a swingable plate 41 which is connected to a speed selector 42 so that the plate may be shifted to selectively locate the idlers in driving engagement with a motor shaft 43 and the friction wheel 39.

Figure 3:
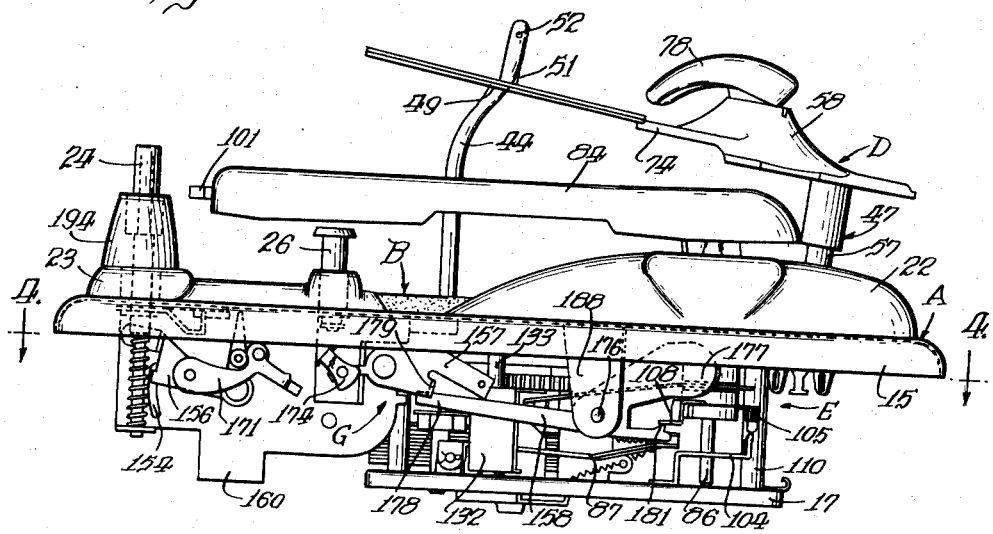
Fig. 3 is a side elevational view, taken from the right of Fig. 1.

The selective record support and release mechanism D comprises a spindle 44 concentric with the turntable B (see Figs. 1 and 3), a rocker arm 46, and a mounting 47 (see Figs. 10 and 12). The spindle 44 is of well-known construction. Its lower extremity is cut away, as shown at 48 in Fig. 5, and its upper end is angularly inclined and provided with a record supporting shoulder 49 and latch block 51, as shown in Fig. 3. The spindle 44 sets in the sleeve 34 (see Fig. 2) with the end beyond the cut-away 48 extending through a semicircular notch in the bottom of the subbase section 16 to be held thereby against rotation. The latch block 51 is slidably supported on a pin 52, and acts to insure release of but a single record with each operation of the selective record support and release mechanism D.

The rocker arm 46, as most clearly appears from Fig. 10 is channel-shaped with the parts 53 and 54 extending at nearly right angles to each other. The part 53 is formed with an apertured transverse flange 56 at its upper end which coacts with an aperture in the rocker arm 46 to serve as a bearing for a shaft 57 on the upper end of which is mounted a push-off head 58 comprised in the selective record support. The part 54 is hinged by a pin 61 to ears 59 struck up from the subbase section 17.

The part 54 of the rocker arm 46 mounts an auxiliary channel-shaped arm extension 62 hinged to the pin 61 and mounting a roller 63 at its outer end. A set screw 64, threaded into the extension 62, makes possible an angular adjustment of the extension 62 with respect to the rocker arm 46 so as to relate the roller 63 to the cam means F (hereafter to be described), and thereby insure a proper movement of the push-off head 58 to successively displace laterally the records which are supported on the spindle shoulder 49. A small wire 65 (see Fig. 10) extends around the screw 64 and out through apertures in the extension 62 to provide sufficient friction to hold the screw 64 against free turning. A spring 72 interposed between the main base section 15 and the rocker arm part 54, normally urges the rocker arm 46 to hold the roller 63 against certain cam means to be described at a later point herein.

The record support mounting 47 comprises the shaft 57 and the push-off head 58. Above its lower end the shaft 57 is adjustably secured to a collar 66 whereon is formed four angularly spaced V-shaped notches 67 for coaction with a selector stop 68 for holding the shaft 57 and push-off head 58 in any one of three predetermined positions. A spring 69 interposed between the flange 56 and the selector stop 68 permits the selector stop to retract from the notches 67 when the shaft 57 is turned, and releasably holds the record support mounting 47 in its various shifted positions. A tongue 70 on the stop 68, extending through a slot 71 on the rocker arm 46 (see Fig. 7), secures the stop against circumferential displacement while allowing for its axial shifting of the shaft 57. The collar 66 carries a lug or shoulder 73 (see Fig. 9) which, as will be set forth more fully hereinafter, comes into position for one of the rotative adjustments of the push-off head 58 to insure a positioning of the tone arm to set down its stylus at the correct beginning-of-play position for records of one of the three diameters for which the push-off head 58 provides a marginal support.

The push-off head 58 is of generally rectangular form with an extension 74 at one of the narrower sides. The opposite longer sides of the main part and the end of the extension 74 are formed with pairs of shoulder ledges 75, 76 and 77, respectively, whereon the margins of records of various diameters are supported above the turntable B in coaction with the spindle shoulder 49, as most clearly shown in Fig. 3. The push-off head 58 is eccentrically secured to the shaft 57 so that the radial distance between the spindle shoulder 49 and a line through the respective shoulders 75, 76 and 77 will be slightly less than the radii of the records of different diameters, as for example, 12", 10" and 7", thus providing a marginal support for a stack of any one of these records as determined by the rotative position of the push-off head 58.

A weighted hold-down 78 for the stack of reserve records is swiveled and hinged on the push-off head by means of a pin 79 (see Fig. 12). A compression spring 81 normally urges the record hold-down 78 to press its outer end against a stack of records cooperatively supported on the push-off head 58 and the spindle shoulder 49. A lug 82 on the underside of the record hold-down fits in one of the three recesses 83, formed in the opposed face of the push-off head 58, so as to properly position the record hold-down with respect to the record-supporting ledges 75, 76 and 77.

The tone arm positioning mechanism E comprises a tone arm 84 swingably mounted on a rotatable and axially shiftable shaft 86 which is actuated by a lever 87 under the action of the velocity latch controlled cam means F (hereinafter to be described in detail) as influenced by a tensioning arm 88 and a coacting restraining lever 89 and a detent 91.

The tone arm 84 is of conventional construction, preferably being in the form of a downwardly facing channel that is bowed endwise. At its rear end the tone arm carries a plate 92 (see Fig. 13) to which is hinged a plate 93 mounting an angular bracket 94 whereto is anchored an inverted U-shaped bracket 96 hinged to a U-shaped bracket 97 that is staked to the upper end of the tone arm shaft 86. A hook 98 at the forward end of the plate 92 releasably engages the adjacent forward end of the plate 93 to permit the tone arm 84 to be swung upwardly on the hinge connecting these plates 92 and 93. A spring 100 normally counterbalances the weight of the tone arm 84 so that its stylus bears with only light pressure on the record under play.

On its forward end the tone arm mounts a conventional transducer whereon is formed a finger 101 so that a stylus of appropriate character may be positioned for a fast or a slow record. A roller 102 on the end of the bracket 94 is disposed under a hook 103 secured to the main base section 15 to control the vertical swinging of the tone arm 84 as a result of the axial movement of the shaft 86. The bracket 94 mounts the usual eccentric cam screw 99 which coacts with the plate 93 to secure the required adjustment of the stylus with respect to a record sound groove.

Figure 4:
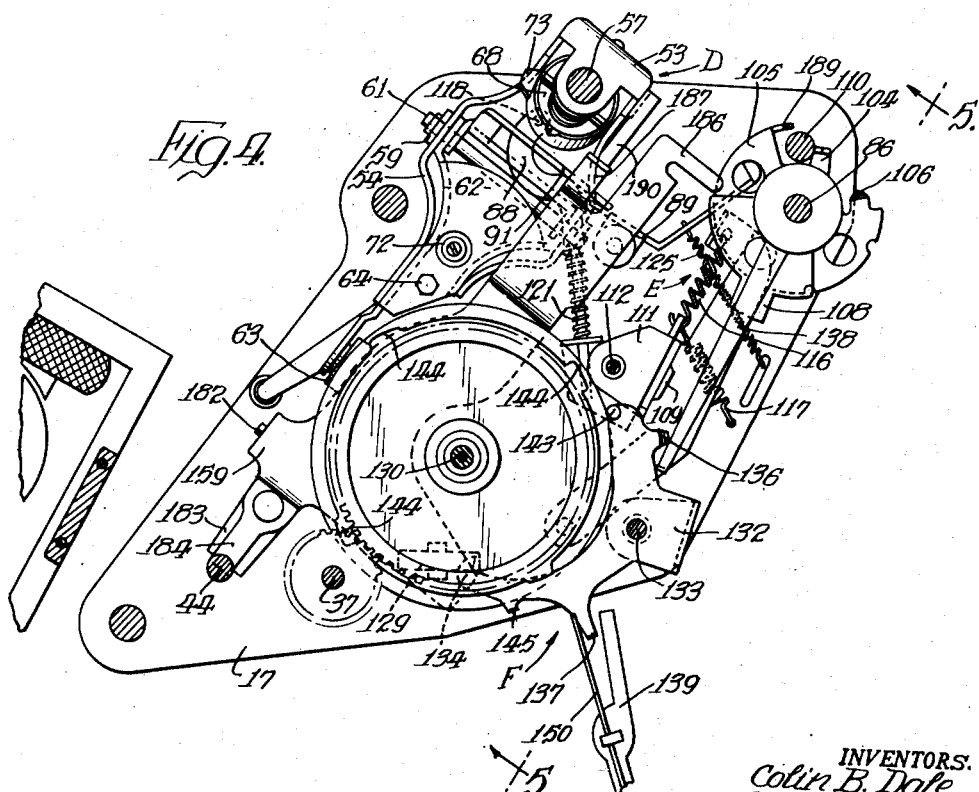
Fig. 4 is a top plan view of the record changer and tone arm positioning mechanism as viewed from the plane of line 4—4 of Fig. 3.

The tone arm shaft 86 is rotatably and axially shiftable on the main base section 15 and a bracket 104 is secured to the subbase section 17 adjacent a base supporting post 110. At the upper end of the shaft is staked the bracket 97 and inwardly of its lower end the shaft 86 mounts a disc 105. This disc is cut away partially, as shown in Fig. 4, and formed thereon are three depending shoulders 106, 107, and 108 (see Figs. 5 and 6) all of which coact with other parts, presently to be described, to either effect proper swinging of the tone arm for setting its stylus down correctly at the beginning-of-play position on each of the successive records or to shut off the motor switch after playing of the last record.

The tone arm operating lever 87 is pivoted at 109 to a bracket 111 hinged on a post 112 on the subbase section 17. At its outer or rear end the lever 87 is formed with an angularly disposed flange 113 the upper edge of which engages the underside of the flange disc 105 for the purpose of shifting the shaft 86 axially and imparting rotation thereto. At its inner or forward end the lever 87 mounts a cam track follower 114 which is arranged to engage one of the cam tracks on the velocity latch controlled cam means F, as will be described more fully hereinafter. A spring 116 connecting the flange 113 with the bracket 111 and a record spring 117 connecting the bracket 111 with the subbase section 17 coact to hold the lever 87 with its cam track follower 114 in proper position with the cam track of the cam means F.

The tensioning arm 88 (see Figs. 7, 8 and 9) has its outer end arcuate shaped and is pivoted at 118 (see Fig. 10) to the underside of the collar 66 on the push-off supporting shaft 57. The inner end of this arm 88 extends through a slotted ear 119 on the bracket 111 and mounts a spring 121 between the ear 119 and a shoulder 122 formed medially on the arm 88. This tensioning arm 88 and spring 121 coact to bias the lever 87 so that the cam track follower 114 will properly engage the walls of one or the other of the cam tracks, as will be set forth presently, to set the tone arm down, together with its stylus, at the correct beginning-of-play position for either a 12″ or 7″ record.

The restraining lever 89 (see Figs. 4, 7, 8 and 9) is pivoted on a pin 123 so that a shoulder 124 on one of its arms is disposed below the tone arm disc 105 but is retracted by a spring 125 from the path of the shoulder 107 on the disc 105. The other arm of the lever 89 extends into the path of the detent 91. This detent is hinged on the pin 61 (see Fig. 10) and normally urged by gravity so that its upper part extends toward the collar 66. As will be noted, the upper part of this detent 91 is disposed above the tensioning arm 88. When the selective record support mounting 47 is turned so that the shaft 57 moves the lug 73 into the position shown in Fig. 9, the lug 73 presses the detent 91 outwardly nearly into contact with the restraining lever 89; consequently a subsequent rocking of the rocker arm 46 shifts the restraining lever 89 to bring the shoulder 124 in the path of the shoulder 107 on the tone arm shaft disc 105. This results in so restraining an inward swing of the tone arm 84 as to cause its stylus to be set down at the correct beginning-of-play position on a record of 10″ diameter.

The trigger controlled cam means F may be generally the same as the mechanism disclosed in the Dale Patent No. 2,509,811, dated May 30, 1950. This mechanism is shown to comprise a cam 126 on the periphery of which is formed a cam track 127 and in the face of which is formed a cam track 128. The peripheral track 127 is shaped to engage the roller 63 and effect the desired rocking of the rocker arm 46, whereas the facial track 128 is shaped to be engaged by the cam track follower 114 so as to effect the desired movement of the lever 87 for swinging the tone arm 84 between its starting and finish-of-play positions and setting its stylus down at the correct beginning-of-play positions for any one of the three diameter records. Further details of these cam tracks will be explained presently.

The cam 126 is journaled below and concentrically with the gear 38 on a stud shaft 130 anchored to the main and subbase sections 15 and 17 (see Fig. 10). The cam 126 mounts a velocity latch 129 normally urged by gravity to engage the angular end thereof with the annular series of notches 131 formed on the underside of the gear 38 so as to connect the cam 126 to rotate in unison therewith. A velocity trip 132 is journaled on a pin 133 at the side of the gear 38, and its inner end 134 is so disposed as to normally contact the latch 129 and retract it from engagement with the teeth 131 of the gear 38 (see Figs. 4 and 11). Shoulders 136 and 137 on the trip 132 are positioned to be engaged respectively by a tone arm feather 138 or the reject arm 139 (see Fig. 4) to effect a swing of the tone arm 84 and the release of a record onto the turntable B.

The feather 138 is swingably mounted on the tone arm shaft 86 and is held in contact with a friction pad 142 against the hub of the disc 105 by a weight 141 (see Fig. 5). A pin 143 on the velocity trip 132 is constantly engaged by lugs 144 on the gear 38 so as to retain the velocity trip 132 with the end 134 retracting the latch 129 from engagement with the teeth 131 on the gear 38. This prevents a release of the latch 129 until the feather 138 is moved toward the inward limit of its movement at a time when the stylus is traversing the fast pitch groove near the center of the record, following the completion of a playing thereof. A shoulder 145 on the tripper arm 132 (see Fig. 5) contacts the periphery of the gear 38 and limits the inward swing of the tripper.

The reject tripper arm 139 is pivoted at 140 (see Fig. 1) on the underside of the main base section 15 with the finger 165 extending into position to be contacted by the motor switch actuating means, as will later be explained in connection with the "last record" motor shut-off mechanism G. The inner end of the arm 139 mounts a spring feeler 150 for contacting the tripper shoulder 137 when the arm 139 is actuated and is normally biased by a spring 152 (see Fig. 1) toward its retracted position. The cam track 127 is formed with a depression 149 (see Fig. 6) which defines the "rest" position for the roller 63 on the rocker arm 46. From this point the cam is formed with a rise 151 (see Fig. 5) in approaching the rocker arm 46 which is actuated to operate the push-off head 58 and thereby the lowermost record from the spindle shoulder 49 for release to the turntable therebelow.

The cam track 128, as will be most clearly noted from Figs. 7, 8 and 9, has its vertical walls 146 and 147 spaced apart more widely at certain places than elsewhere. This is to permit the cam track follower 114 to be pressed to engage one or the other of these walls during the angle between the dot and dash lines 148 so as to effect the proper set-down of the stylus at the beginning-of-play position on records of different diameters. The bottom of the track 128 is waved in a vertical plane so as to effect the desired vertical swing of the lever 87 and the consequent vertical swing of the tone arm 86.

Obviously the form of the cams 127 and 128 are coordinated so that shifting of the rocker arm 46 takes place when the actuating lever 87 has swung the tone arm outwardly sufficiently to clear the next-to-be-released record.

The last-record motor shut-off mechanism G comprises a switch actuating rocker arm 156 and a pair of levers 157 and 158, and an immobilizing no-record lever 159 (see Figs. 3 and 15). The rocker arm 156 is pivoted on a plate 160 adjacent a rod 161 whereon is mounted the reject button 24. The rocker arm 156 and rod 161 are operatively united by a pin and slot connection 162. A shoulder 163 on the rocker arm 156 extends through a slot 154 in the plate 160 and is connected to a switch arm 164 of a switch 168. A spring 166, interposed between the pin of the pin and slot connection 162 and an ear 167 on the plate 160, normally urges the reject button rod 161 upwardly and thereby opens the switch 168.

The lever 157 is pivoted at 172 so that its weighted end 173 normally urges the pivoted detent 174 on the opposite end upwardly away from the end 175 of the gravity latch 171. The lever 158 is pivoted at 176 to an ear 188 on the base section 15 so that its weighted end 177 normally urges the opposite end 178 into the path of a shoulder 179 on the lever 157. A cam shoulder 181 on the lever 158 is thus positioned to be engaged by the shoulder 108 on the arm disc 105 when the tone arm 84 is held in its starting position as a result of freeing of the no-record lever 159.

The no-record lever is hinged at 182 (see Fig. 5) on the subbase section 17 so that the end 183 thereof extends into the spindle cut-away 48. A leaf spring 184 is secured to the lever end 183 and interposed between the lever end 183 and the cut-away end 48 of the spindle (see Fig. 5) to afford a pressure means for elevating the spindle 44 when the last record has been released. The other and longer portion of the no-record lever 159 is of stepped angular form and extends rearwardly with its extremity bifurcated to provide offset tongues 186 and 187 (see Figs. 4 and 5) located respectively adjacent and between the tone arm shaft 86 and the rocker arm 46. The tongue 186 is so formed that when the lever 159 is free, by reason of the release of the last record from the spindle 44, the tongue will engage a shoulder 189 on the cut-away flange of the tone arm disc 105 and prevent the next inward movement of the lever 87 from swinging the tone arm toward the beginning-of-play position. At that time the flange 113 simply slides along the under edge of the flanged disc 105 and, when the lever 87 begins its vertical movement to permit a depression of the tone arm shaft 86, the shoulder 108 contacts the cam shoulder 181 on the lever 158. The consequent swing of the lever 158 is transmitted to the latch 171 through the lever 157 and detent 174 to effect a release of the rocker arm 156, thus opening the switch 168. The tongue 187 coacts with a tongue 190 on the rocker arm 46 to prevent any depression of the rocker arm 159 during swinging of the rocker arm 46.

As will be noted from Fig. 15, the detent 174 is pivoted off center so that it is weighted to assume the position therein shown which is fixed by the shoulder 191 on the adjacent end of the lever 157. When the lever 157 is actuated by the lever 158, the detent 174 is firmly held against the shoulder 191 to effect the depression of the arm 175 of the latch 171 to release the roller 153. A slight projection 192 is formed on the detent 174 to insure contact with the end of the latch arm 175. This same shoulder 191 also limits the swing of the detent 174 in the opposite direction so that it cannot pass beyond a position for effective contact with the latch arm 175. As will be further noted from Fig. 15, the stop button 26, normally retracted by a spring 193, is positioned directly over the detent 175. This makes it possible for the button 26 to be depressed for releasing the latch 171 to permit the spring 166 to shift the rocker arm 156 to open the switch 168.

Concentrically arranged with the reject button 24 is a swiveled hub 194 (see Figs. 1 and 15). An arrow point 196 on the hub 194 may be turned to either of two positions, represented by arrow points 197 and 198 on the crescent plate 23, for adjusting the machine for either manual or automatic playing of records. An arm 199 is arranged on the hub 194, below the base section 15, so that when the hub 194 is turned to "manual" position, the arm 199 cams the finger 165 on the reject tripper arm 139 to hold the arm inoperative, thus allowing the velocity trip 132 to maintain the latch 129 retracted and thereby prevent rotation of the cam 126 with the gear 38. When the tone arm 84 is swung to its rest or starting position, with the outer end of the arm directly over the stop button 26 (see Fig. 1), the shoulder 106 on the tone arm disc 105 moves up over the pointed end 201 of the bracket 104 (see Fig. 5) and seats itself between the pointed end 201 and the adjacent base post 110 so that the tone arm 84 is yieldingly held against accidental displacement.

The operation of the present record changing mechanism is substantially as follows:

Assuming the tone arm 84 is in starting or rest position, as shown in Fig. 1, the first action is that of rotatively adjusting the selective record marginal support and release mechanism D in position to accept a supply of records of the diameter which it is desired to be played, i. e. 7", 10" or 12". To that end the push-off head 58 (see Figs. 1, 3 and 12) is rotated to position one pair of shoulder ledges 75, 76 or 77 (according to the diameter of the records to be supported) directly opposite the spindle 44. The record hold-down 78 is lifted to its retracted position, as shown in dotted outline in Fig. 12, whereupon a supply of records may be stacked upon the spindle shoulder 49 to be marginally supported by the shoulders opposite thereto on the push-off head 58. The next step is the shifting of the speed selector 42 to register it with the numbers 78, 45, or 37 which are indicative of the speed at which the chosen record is designed to operate. A third preparatory step is turning the hub 194 so that the pointer 196 is registered with the "automatic" pointer 198 on the crescent plate 128.

To start the machine, the reject button 24 is depressed. This shifts the switch operating rocker arm 156 from the position shown in Fig. 3 to that shown in Fig. 15, and moves the switch arm 164 to close the switch 168 to the motor which drives the shaft 43 (see Fig. 1). The shifting of the rocker arm 156 causes the part 169 to contact the finger 165 and swing the arm 139 to contact the spring feeler 150 with the shoulder 137 and shift the velocity trip 132 to retract the end 134 thereof from engagement with the latch 129. The release of the latch 129 results in an engagement thereof with the teeth 131 on the gear 33 (see Fig. 11) and causes the cam 126 to rotate with the gear 38. Thereupon the cam track 127, acting on the roller 63, initiates a swinging of the rocker arm 46 (see Fig. 10) to move the record support and push-off head 58 inwardly toward the spindle 44 (see Fig. 3). In a well-known manner this produces release of a record to the turntable B.

Meanwhile the cam track 128 actuates the lever 87 to elevate the tone arm 84 and swing it out to its starting position (see Fig. 1) and start it back to a position whereat the tone arm stylus is to be set down at the beginning-of-play position on the record coincidentally released. The point at which the tone arm 84 is set down upon a record depends upon the position to which the record support mounting 47 is turned.

Such a rotative adjustment determines the action of the tensioning arm 88 and of the restraining lever 89. If the push-off head 58 is set to support 12" records, the arm 88 will be so positioned that there is no tension on the spring 121 (see Fig. 7). Accordingly the spring 117 will urge the lever 87 to retain the cam track follower 114 against the cam track wall 146 thereby limiting the swing of the tone arm 84 to its farthest "out" position; in consequence, as the follower 114 moves through the angle between the lines 148 the stylus will be set down at the beginning-of-play position for a 12" record.

If the record selector mounting 47 is set for the push-off head 58 to support a 7" record (see Figs. 3 and 8), the spring 121 will be compressed. The compression of this spring counteracts the spring 117 and presses the lever 87 to position the follower 114 against the cam track wall 147, thereby permitting the tone arm 84 to swing to its farthest "in" position; in consequence, as the follower 144 moves through the angle between the lines 148, the stylus will be set down at the beginning-of-play position for a 7" record.

If the record support mounting 47 is turned so that the push-off head 58 will support a 10" record (see Figs. 4 and 9), the lug 73 on the collar 66 is moved to contact the detent 91 which is advanced toward contact with the adjacent part of the tone arm restraining lever 89. Such rotation of the record support mounting 47 continues and, in fact, increases the tension on the spring 121 on the arm 88. However, as the rocker arm 46 is swung to push off a record, the rocker 46 presses the lug 73 to cause the detent 91 to shift the lever 89 to move the shoulder 124 into the path of the shoulder 107 on the tone arm disc 105. The engagement of these shoulders (see Fig. 9) arrests the inward swing of the tone arm at a point intermediate the farthest "out" and farthest "in" positions (for the records of 7" and 12" diameters, respectively). At the point of arrested movement of the tone arm the knife edge of the flange 113 simply rides along the under edge of the disc 105, whereupon the lever 87 subsequently acts to set the needle down at the beginning-of-play position for a 10" record.

The placing of records on the spindle shoulder 49 and the record push-off head 58 results in a depression of the spindle 44, thus depressing the no-record rocker arm 159 (see Fig. 5). This elevates its outer end as viewed at the right of Fig. 5, and raises the tongue 186 from the normal path of the tone arm disc shoulder 189. Thus so long as there is one record supported on the spindle 44 there will be no interference with the return swing of the tone arm 84 from its starting position. However, upon the release of the last record from the spindle shoulder 49, the outer end of the rocker arm 159 will drop down to rest the tongue 186 on top of the disc 105 so that as the tone arm 84 reaches its fully-retracted starting position, the tongue 186 will drop off behind the shoulder 189. Thereupon, as the tone arm lever 87 attempts to swing the tone arm 84 back toward the beginning-of-play position, the tone arm is not permitted to move horizontally of its starting position. In consequence, when the lever 87 is moved to lower the tone arm shaft 86 the shoulder 108 on the disc 105 contacts the end 181 of the lever 158 (see Fig. 3) and initiates a chain action that results in the lever 157 being shifted so that the detent 174 contacts the part 175 of the locking latch 171 and retracts it from engagement with the roller 153 on the arm 156. This frees the spring 166 to shift the reject rod 161 and the reject button 24 upwardly, thereby swinging the switch arm 164 to open the switch 168 and cut off the motor.

When it is desired to release another record before the playing of a previously released record is finished, a depression of the reject button 24 will actuate the rocker arm 156 (see Fig. 14) so that the part 169 on the arm 156 contacts the finger 165 on the reject arm 139 and shifts it to retract the velocity trip 132 (see Fig. 4), thereby releasing the latch 129 to effect a rotation of the cam 126 with its consequent operation of the record push-off rocker arm 46 and lever 87 to respectively release a record from the spindle shoulder 49 and reset the tone arm 84 at the beginning-of-play position for the record so released.

For manual play of records, the hub 194 is turned to "manual" position and the tone arm 84 is lifted from its fully retracted starting position and swung inwardly slightly to allow the stylus to be set down on the pad 27 (see Fig. 1). Turning of the hub 194 shifts the arm 199 to engage the finger 165 and lock the arm 139 to hold the tripper 132 to maintain the latch 129 retracted. Following placing of a record on the turntable B the reject button 24 may be depressed to effect a shifting of the rocker arm 156 so as to hold the motor switch 168 in closed position. At the completion of play the tone arm 84 will have to be manually returned to set the stylus on the pad 27. At that time, if the machine is to be stopped, a down push on the stop button 26 (see Fig. 15) will cause the detent 174 to retract the latch 171 and release the rocker arm 156, as previously described.

We claim:

1. A record changer and tone arm swinging mechanism comprising a supporting base, a tone arm swingably mounted on the base, a tone arm actuating lever mounted on the base to effect horizontal and vertical swinging of the tone arm to set it at the beginning-of-play position on a record, a motor driven cam means journaled on the base and having a cam groove formed therein providing opposed inner and outer walls, a cam track follower on the lever, a record support manually selective to support a stack of records of any one of three different diameters, means controlled by the record support for biasing the follower to traverse one or the other of the cam groove walls to cause the lever to set the tone arm at the beginning-of-play position for either of two different diameter records, and other means controlled by the record support for neutralizing the operation of the follower biasing means and causing the lever to set the tone arm at the beginning-of-play position for a record whose diameter is intermediate that of the other two records.

2. In a phonograph, the combination of a supporting base, a record supporting turntable journaled on the base, a motor connected to drive the turntable, a spindle arranged concentrically of the turntable, a tone arm mounted on the base for vertical and horizontal movement away from and toward a starting position, a rocker arm hinged on the base, a roller on one end of the rocker arm, a record support mounting journaled on the other end of the rocker arm and manually adjustable to coact with the spindle for releasably supporting a stack of records of any one of three different diameters above the turntable, a lever mounted on the base for movement about a horizontal and vertical axis to effect swinging of the tone arm, a cam track follower on the lever, cam means having an annular track formed thereon engageable by the rocker arm roller to effect a swinging of the rocker arm on a horizontal axis to cause the successive release of records onto the turntable, the cam means also having formed thereon a second irregular track with depressions and spaced opposed side walls engageable by the lever cam track follower to effect horizontal and vertical swinging of the lever to set the tone arm at the beginning-of-play position for a record released to the turntable, tripper means for effecting an intermittent operation of the cam means, means connecting the record support mounting with the lever whereby the positioning of the record mounting in either of two of its possible positions biases the cam track follower respectively against the opposite walls of the second cam track whereby the tone arm may be set at the beginning-of-play position for records of either of two diameters for which the record support mounting is positioned, a tone arm restraining lever hinged on the base with its opposite arms respectively adjacent the rocker arm and the tone arm, coacting shoulders on the tone arm and the restraining lever, and coacting means on the record support mounting and the rocker arm movable into position to actuate the restraining lever to engage its shoulder with the tone arm shoulder to limit the swing of the tone arm when the record support mounting is shifted to its third position whereby the tone arm is set at the beginning-of-play position for a record whose diameter is intermediate that of the other two records.

3. In a phonograph, the combination of a supporting base, a record supporting turntable journaled on the base, a motor connected to drive the turntable, a spindle arranged concentrically of the turntable, a tone arm mounted on the base for vertical and horizontal movement away from and toward a starting position, a rocker arm hinged on the base, a roller on one end of the rocker arm, a record support mounting journaled on the other end of the rocker arm and manually adjustable to coact with the spindle for releasably supporting a stack of records of any one of three different diameters above the turntable, a lever mounted on the base for movement about a horizontal and vertical axis to effect swinging of the tone arm, a cam track follower on the lever, cam means having an annular track formed thereon engageable by the rocker arm roller to effect a swinging of the rocker arm on a horizontal axis to cause the successive release of records onto the turntable, the cam means also having formed thereon a second irregular track with depressions and spaced opposed side walls engageable by the lever cam track follower to effect horizontal and vertical swinging of the lever to set the tone arm at the beginning-of-play position for a record released to the turntable, tripper means for effecting an intermittent operation of the cam means, means connecting the record support mounting with the lever whereby the positioning of the record support mounting in either of two of its two possible positions biases the cam track follower respectively against the opposite walls of the second cam track whereby the tone arm may be set at the beginning-of-play position for records of either of two diameters for which the record support mounting is positioned, a tone arm restraining lever hinged on the base with its opposite arms respectively adjacent the rocker arm and the tone arm, coacting shoulders on the tone arm and the restraining lever, a detent hinged on the record support rocker arm and normally retracted from a position to contact the tone arm restraining lever, and a shoulder on the record support mounting movable by shifting of the record support mounting to a third position to dispose the detent to engage the tone arm restraining lever so that when the record support rocker arm is actuated by the cam means the detent will shift the tone arm restraining lever to effect engagement of the shoulders on the tone arm and the tone arm restraining lever to limit the swing of the tone arm whereby it is set at the beginning-of-play position for a record whose diameter is intermediate that of the other two records.

COLIN B. DALE.
ARNE L. BERG.
HARRY H. WAGNER.

References Cited in the file of this patent

UNITED STATES PATENTS

| Number | Name | Date |
|---|---|---|
| 1,966,576 | Allen | July 17, 1934 |
| 2,328,641 | Glaser | Sept. 7, 1943 |
| 2,333,414 | DeTar | Nov. 2, 1943 |
| 2,339,981 | Cranmer et al. | Jan. 25, 1944 |
| 2,396,094 | Gay | Mar. 5, 1946 |
| 2,457,106 | Pressley | Dec. 21, 1948 |
| 2,486,898 | Wennerbo et al. | Nov. 1, 1949 |
| 2,509,811 | Dale | May 30, 1950 |
| 2,549,246 | Schweitzer | Apr. 17, 1951 |
| 2,584,257 | Cain | Feb. 5, 1952 |

FOREIGN PATENTS

| Number | Country | Date |
|---|---|---|
| 419,299 | Great Britain | Nov. 5, 1934 |
| 429,635 | Great Britain | June 4, 1935 |